Dec. 20, 1955 W. J. VAN DE LINDT 2,728,050

DEVICE FOR MODULATING ULTRA-SHORT WAVES IN A TANSMISSION LINE

Filed May 9, 1951

2 Sheets-Sheet 1

INVENTOR
WILLEM JACOBUS VAN DE LINDT
BY Fred M Vogel
AGENT

INVENTOR
WILLEM JACOBUS VAN DE LINDT

United States Patent Office 2,728,050

Patented Dec. 20, 1955

2,728,050

DEVICE FOR MODULATING ULTRA-SHORT WAVES IN A TRANSMISSION LINE

Willem Jacobus van de Lindt, Eindhoven, Netherlands, assignor to Hartford National Bank and Trust Company, Hartford, Conn., as trustee Application May 9, 1951, Serial No. 225,445

Claims priority, application Netherlands May 20, 1950

4 Claims. (Cl. 332—51)

This invention relates to a device for modulating ultra-short waves in a transmission line. It is known to modulate ultra-short waves (centimeter waves and decimeter waves) in a transmission line by detuning a resonator, particularly a cavity resonator in accordance with the modulation signals, said resonator being connected to the line, or by coupling the line to a resistive impedance, the resistance component of which is altered in accordance with the modulation signals. A disadvantage inherent in many devices based on this principle is that the loading of the generator supplying said waves is altered upon modulation, so that frequency modulation and an unwanted amplitude modulation may occur. It has been suggested to obviate this disadvantage by using an element comprising a main line which is supplied from the generator, said element being tapped so that the high-frequency energy current splits into two equal parts which are modulated complementarily by resonators coupled with the branches, only one of the modulated energy currents being made available in a transmission aerial and the other current being absorbed by a terminal impedance. It is also known to cause part of the energy of such a device to be absorbed by resistance elements arranged in the branches of the main line, this part being altered in accordance with the modulation signal in both branches in the same sense, the longitudinal difference of the branches being equal to a quarter wave length of the oscillation in the line so that the waves reflected at the ends arrive in phase opposition at said tap so that they cannot penetrate into the first line and the generator but move to a fourth line directed at right angles to the first line and to the branches, the fourth line having such dimensions that it is unaccessible to the non-modulated waves issuing from the first line.

A disadvantage inherent in many known devices is that particular precautions are required to ensure that reflections do not occur at the tapping point and, thus, to restrict the capacity.

The object of the invention is to provide a structurally simple device in which many disadvantages of the known devices are obviated, at least in part. The device is particularly suitable for a wide frequency band.

According to the invention, a device for modulating ultra-short waves in a transmission line comprises a first line section which is connected to a source of ultra-high frequency oscillations and which at several points distributed in the longitudinal direction is coupled to a second line section so that if the ends of the two sections remote from the generator were closed, the energy current emanating from the generator would have split up at these ends into two equal parts, each of the sections being provided at the said ends with a reflection member such that the reflection coefficients of these members are identical, whereas the end of the second section nearer the generator is closed by a load free from reflection. In addition, means are provided to alter the reflection coefficients in an identical manner in accordance with a modulating signal such that upon variation of the reflection coefficients the load of the generator does not vary and the waves directed towards the ends of the second line section are modulated by the signal.

A reflection member is to be understood to mean, hereinafter, a member which reflects the waves at least in part. The reflection members are preferably constituted by cavity resonators which are coupled to the line sections. The desired effect may be obtained by altering either the imaginary or the real components of the reflection coefficient in accordance with the modulating signal. As a rule, the two components will be altered at the same time.

It is known per se that between two adjacent hollow wave guides of rectangular cross-section which have a wall in common, a coupling can be obtained when several apertures, preferably slit-shaped, are provided in the common wall. The energy which is supplied from a source of ultra-high frequency oscillations connected to the end of one of the guides, penetrates through these apertures into the other guide and, if the apertures are arranged in the correct manner, the waves penetrating through the apertures into the second wave guide and propagating therein amplify each other in the direction of one end of the second guide and compensate each other in the direction of the other end, thus setting up a travelling wave in the second guide. If the number and shape of the apertures are properly chosen, the wave in the first guide may be entirely absorbed by the second guide so that the coupling factor between the two wave guides may be assumed to be equal to 1. A proper choice of the form and position of the apertures ensures that such a coupling does not vary with frequency to a marked extent and enables the coupling to transmit a wide band of frequencies.

In the device according to the invention, use may be made of such an element, the lengths of the two line sections being however, such that the coupling factor is at least approximately 0.5 and the sections being closed by reflecting members. The term 'coupling factor" is to be understood hereinafter to mean the ratio between the transmited energy and the energy supplied from the generator. If the said members would reflect all the incident energy, the energy reflected in the first line section would, during the return, be transmitted to the second line section in a manner similar to that in which first half the energy has been transmitted to the second wave guide and all the energy could pass to the second line section. Varying the reflection coefficient permits the quantity of reflected energy to be altered. If the reflection coefficients of the two reflection members remain invariably identical, all the energy reflected by the reflection member in the first line section will be transmitted to the second line section irrespective of the value of the reflection coefficient. The second line section is connected to a load, particularly a transmitting aerial, so as to be free from reflection. The non-reflected quantities of energy may be absorbed by an absorption element or utilized in the manner described as under.

The two wave guides may be coupled in a different manner, for example, by means of coupling loops arranged at various points in the guides. This method is employed, for example, in the case of co-axial guides. As an alternative, the transmission lines may be constituted by Lecher-wires, coupled in a suitable manner so that about half the energy supplied to one end of one of the guides is transmitted by the coupling to the other guide. In this case, the reflection members will be constituted by concentrated variable impedances. In this case and also when other kinds of transmission lines are used, the coupling may be distributed continuously along the line section. In the case of hollow wave guides, this may be effected by means of a continuous slit which connects the lines.

Preferably, the reflection members are equally spaced apart from the source of high-frequency oscillations and are arranged in the same plane at right angles to the adjacent lines. They may be unequally spaced apart from the said source but this is usually not desirable as it results in reducing the band width of the frequencies transmitted by the coupling.

In order that the invention may be clearly understood and readily carried into effect, it will now be described more fully with reference to the accompanying drawings, in which.

Figures 1, 2, 3, 4A, 5, 6:
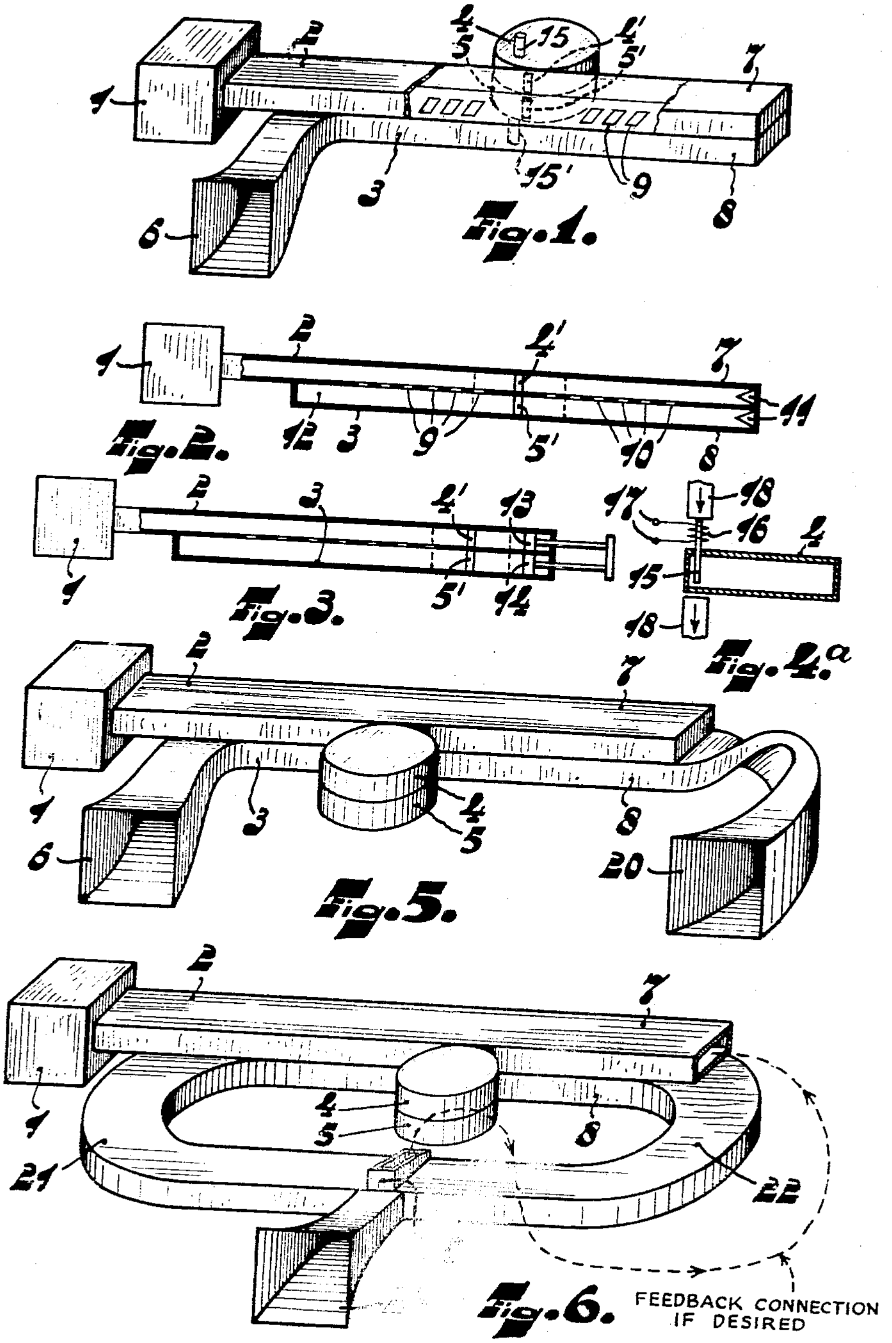
Fig. 1 is a perspective view of a device according to the invention.
Fig. 2 is a vertical section taken on the axis of the device shown in Fig. 1.
Fig. 3 is a sectional view of a modified form.
Figure 7:
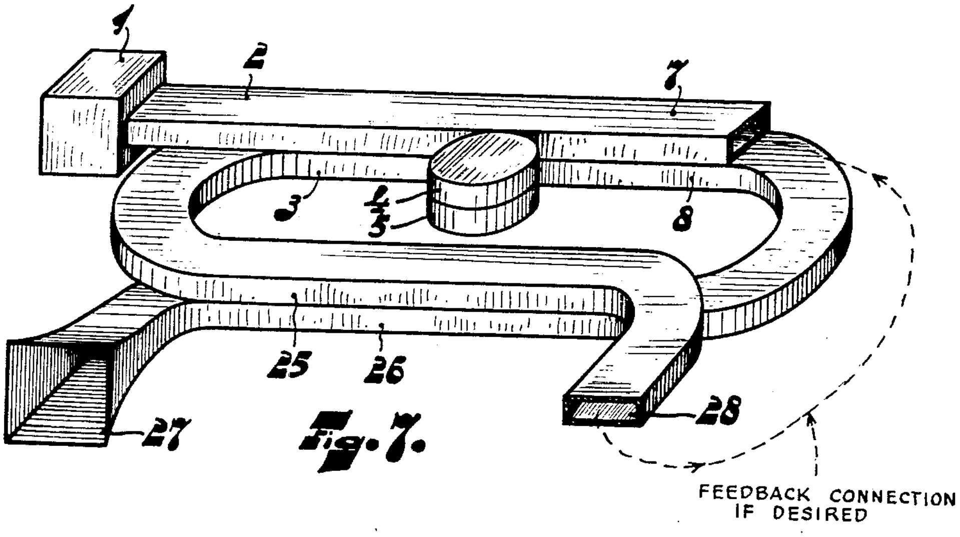
Figure 4:
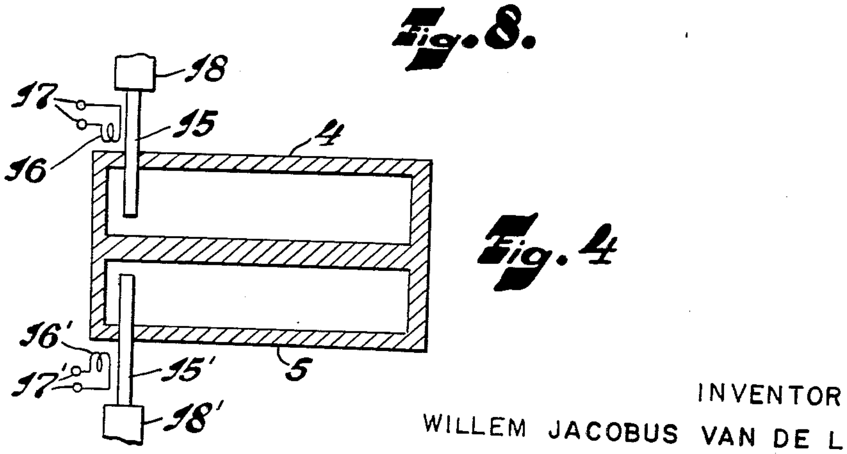
Fig. 4 shows one embodiment of a device for changing the natural frequency or the absorption properties of a cavity resonator which may be used to constitute a reflector member in a device according to the invention.

Fig. 4*a* shows an alternative embodiment to that shown in Fig. 4;

Fig. 5 is a perspective view of one embodiment of a device according to the invention, in which the energy transmitted by the reflection members is also utilized;

Fig. 6 shows a device according to the invention in which the side bands of the carrier wave can be separated;

Fig. 7 shows a modified form of the device shown in Fig. 6; and

Figure 8:
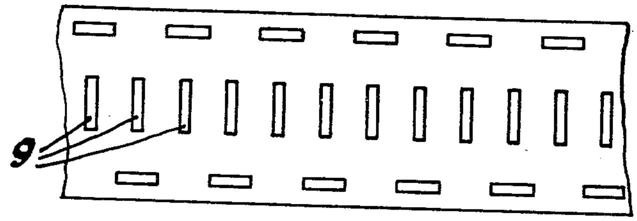

Fig. 8 shows one embodiment of a part of a coupling member with which a device according to the invention may be used.

Fig. 1 shows a device for amplitude modulation of ultra-high frequency oscillations. The source of ultra-high frequency oscillations 1 is connected to a section 2 of a hollow rectangular wave guide in which, at the frequency chosen, only one wave type can propagate, the electric field vector being directed at right angles to upper and lower surfaces. Positioned below the section 2 is a section 3 having the same cross-section as the section 2 and coupled thereto a various points along the length. This coupling may be effected in well-known manner by means of a number of slits shaped in the form shown in Fig. 8. The slits connect the interior of the guide 2 to the interior of the guide 3. There are two series of apertures, the first series comprising slits extending transversely to the center line of the common wall on either side of which is arranged a second series of slit-shaped apertures whose dimensions in the longitudinal direction are large compared with those in the direction of width. In this manner a directional coupling is obtained at the area of each pair of slits, that is to say, a coupling such that at the area of each pair of slits the waves passing to the left in the wave guide 3, so far as they are produced by the waves passing to the right in the guide 2, compensate one another substantially completely. The mutual compensation of these waves passing to the left is even intensified due to the fact that there are several of such slits in the guide, between which the spacing is about equal to the quarter of a wave-length in the guide. The effect of such a coupling between two guides is that the energy current passing in the first guide from the left to the right is taken over by the second guide and propagates therein as a travelling wave to the right. It may be remarked that the invention is not limited to this type of coupling but that many other kinds of coupling are possible whereby a similar effect is produced.

According to the invention, the various elementary couplings are such that at the end of the line sections 2 and 3 which is remote from the source of ultra-high frequency oscillations 1, about half the original energy current in the guide 2 has passed to the guide 3. That is to say, the amplitudes of the waves travelling to the right are identical at the ends of the sections.

In addition, a reflector member is arranged at the end of each of the line sections 2 and 3. These reflection members are shown in Fig. 1 as cavity resonators 4 and 5 which, as shown in Fig. 2, are coupled by means of slits 4', 5' with each of the line sections. It is known that if such a reflection member is tuned to the frequency of the oscillations produced, it substantially reflects the energy passing at the area of the coupling slit in the line sections 2 and 3. In this case, in the device shown in Fig. 1, the energy which at the end of the line section 2 is still available therein, will, upon reflection at the coupling slit of the cavity resonator 4, during its return via the coupling members between the sections 2 and 3, be transmitted to the section 3, so that energy does not return to the oscillator 1 through the line section 2. In this case, almost the total energy current produced by this oscillator travels through the line section 3 to the load 6 connected thereto, which may be horn aerial.

If the members 4 and 5 are not tuned to the oscillation produced in the oscillator 1, only partial reflection will occur at the coupling slits. In this case, only part of the energy of the oscillator 1 reaches the load 6. The remaining part moves past the coupling slits to the right through the line sections 7 and 8. If the members 4 and 5 are detuned in the same manner relatively to the frequency produced, the flows of energy in the sections 7 and 8 are equal at the coupling slits. If the sections 7 and 8 are equalized with the sections 2 and 3 and if, in addition, the coupling between 7 and 8 is equalized with that between 2 and 3, substantially all the energy will, at the end of the sections 7 and 8, have passed to the section 8. At the end it may be, for example, absorbed in known manner by the use of one or more wedge-shaped members 11 of reflection-free resistance material. With the devices here described the said wedges may alternatively be arranged directly behind the cavity resonators and in this case two wedges are required, both absorbing the same energy.

If therefore the two reflection members 4 and 5 have a different reflection coefficient, they act as semi-transmitting mirrors, the reflected energy finding its way into the guide 3 and being transmitted, for example, by the aerial 6.

In these circumstances, amplitude modulation of the ultra-high frequency energy is obtained by altering the reflection properties of the members 4 and 5 in an identical manner in accordance with a modulation signal.

If the members are approximately free from loss, the reflection coefficient is preferably chosen to be equal to 0.5, so that half the energy is reflected in each of the line sections.

The manner in which the reflection coefficients are altered is comparatively arbitrary, use being made, for example, of the phenomenon of gyro-magnetic resonance in the manner shown in Fig. 4. With the device shown in Fig. 4, a rod 15 of magnetic material, preferably of a substantially non-conductive ferrite, is subjected to the influence of a permanent magnetic field acting in the longitudinal direction of the rod and produced by the magnet poles 18, so that it is magnetically saturated. The rod is arranged so as to be comparatively close to the circumference of the cylindrical cavity resonator and at right angles to the cross-section thereof. It protrudes in part from the interior of the cavity resonator and the protruding part is provided with a coil 16 to which the modulation oscillations are fed. The alternating magnetic field within the cavity resonator is substantially at right angles to the polarizing magnetic field.

It is known that the permeability of a ferro-magnetic substance which is polarized by a permanent magnetic field and in which, in addition, an alternating magnetic field is active at right angles to the said permanent field, is subjected to a great alteration in the neighborhood of a definite frequency, the so-called "precession frequency." This phenomenon is made available in a device shown in Fig. 4 to alter the resonance properties of the member in accordance with the modulation voltages fed to the terminals 17. Thus, the reflection properties of the member are altered in accordance with the modulation frequency with the result that the energy emanating from the aerial 6 is amplitude-modulated. The resonance properties of the member 5 are altered in the same manner and in the same phase as those of the member 4 in accordance with the modulation frequency.

According to another method, shown in Fig. 4*a*, the ferrite rod is premagnetized in a comparatively feeble manner, i. e., by an amount less than the magnetic saturation value, and the cavity resonator is tuned to the generator frequency. It has been found that with a proper choice of the magnetic properties of the rod, the modulation currents in the coil 16, which produce a magnetic field which aids or opposes the pre-magnetizing field, bring about large variations of the damping of the cavity resonator.

One method of varying the reflecting properties of such cavity resonators makes use of non-oscillating magnetrons which form part of the cavity resonator, the magnetic field of which is altered in intensity in accordance with the modulation frequency, thus altering the absorption properties. As an alternative, the voltage between the anode and the cathode may be altered in accordance with the modulation frequency.

In the device shown in Fig. 1, the cavity resonators are connected to the side walls of the hollow wave guides. As an alternative, the same effect may be obtained by connecting the resonators to the upper and lower surfaces. In either case it will be possible for the aerial to be also connected to the right-hand end of the section 8 and the section 3 at the left-hand end may be closed by a wedge of reflection-free semi-conductive material.

The device described is suitable for high capacities since the apertures are provided in the wide side of the hollow wave guides, and since the electric field vector is directed normal to the plane of the coupling apertures so that the risk of breakdown is low.

Fig. 3 shows a modified form which differs from that shown in Figs. 1 and 2 by the omission of the hollow wave guides 7 and 8 and, instead thereof, providing extensions of the sections 2 and 3 with adjustable pistons 13 and 14 which reflect the energy upon passing through the coupling slits. The spacings between the pistons and the couplings 4' and 5' are adjusted so as to ensure modulation free from distortion, the said spacing being about equal to a half-wave length within the wave guides. If in this device only detuning of the cavity resonators 4 and 5 in accordance with the modulation signal is brought about, loss of energy does not occur upon modulation, so that the energy emanating from section 12 will be plane modulated. If, however, the absorption properties of the members 4 and 5 are altered, if magnetrons are used as absorbing members, it will be possible to obtain amplitude modulation.

With the devices hitherto described for obtaining amplitude modulation of the travelling waves present in a hollow wave guide, part of the energy is lost so that the maximum efficiency to be reached is not more than 50%. The device shown in Fig. 5 enables an increase to approximately 100%. It differs from that shown in Figs. 1 and 2 in that a radiating member 20 which transmits the waves emanating from this section so as to be horizontally polarized, is connected to the end of the line section 8, the radiator 6 transmitting vertically polarized waves. The radiating member 20 also closes this section so as to be free from reflection.

In a similar fashion to the device shown in Figs. 1 and 2, the energy supplied from the generator 1 is distributed about the hollow wave guides 2 and 3 in a manner such that at the area of the variable impedances 4 and 5 about half the energy has passed to the guide 3. Now, if the impedance of the members 4 and 5 are re-altered by the modulation signals, modulation of the energy emanating from the aerial 6 also occurs. The energy occurring at the end of the guide 8 is modulated complementarily by the energy at 6 and is transmitted with a different polarity by the member 20.

The highest efficiency is obtained with the device shown in Fig. 5 if only the tuning of the resonance members is altered and the losses thereof are a minimum.

At the receiver both signals are collected and detected in a pull-push circuit arrangement in which the low frequency modulating voltages are summed. This may be performed with the use of a single aerial, for example, by using a circular or square hollow wave guide conducting waves of both polarities.

In certain cases it is necessary that two differently directed, complementarily modulated beams should be emitted. For this purpose a similar device may be used, it being, however, not necessary for the beams to be polarized differently.

The device shown in Fig. 5 permits suppression of the carrier wave frequency by the use of a junction of several members. A device suitable for this purpose is shown diagrammatically in Fig. 6. The impedances 4 and 5 are adjusted so that the travelling waves occurring in the guides 21 and 22 have the same intensity. These guides are connected to the ends of the hollow wave guides 3 and 8 and are similar in length so that the phase difference at the point of union of the guides 21 and 22 is 180°. The guides are combined there to form a conductor 23 of the same width and height which is terminated in a horn aerial. At the point of union, an arm 24 is added, said arm 24 being prependicular to the arms 21, 22 and 23 and having the same cross-section. However, the largest dimension is directed at right angles to the sides of the smallest dimensions of the arms 21 and 22 and parallel to the axis of the aerial 23. This is the construction known as "magic-T."

The device operates as follows: When the real part of the impedances 4 and 5 is varied, the side bands are conducted to the arm 23, since they are in phase in loco. If the imaginary part of the said impedances is also varied, the same side band conduction takes place, but phase modulation also occurs. The maximum phase shift is 180°.

The high frequency energy entering into the arm 24 is not modulated and has the carrier wave frequency. This energy can be absorbed by a reflection-free absorption member. However, much improved efficiency is obtained if this energy is fed back with the correct phase to the right-hand end of the wave guide 7, after which this energy is modulated in the same manner. This greatly increases the energy in the side bands. It is possible to add a certain amount of carrier wave energy to the energy emanating from the aerial 23 by changing the relative amounts of energy present in arms 21 and 22. This carrier wave thus has the correct phase relative to the side bands. The same result may be obtained by addition of a certain quantity of carrier wave energy from the conductor 24.

If only the imaginary part of the impedances 4 and 5 is varied, phase modulation of the energy emanating from the aerial 23 is obtained, the maximum phase shift being 180°.

The "magic-T" construction may be replaced by a combination of two wave guides which are coupled through a number of slits. Such a device is shown in Fig. 7, one of the wave guides being connected to the left-hand end of the wave guide 3 and the other to the right-hand end of the wave guide 8. The two other ends of the wave guides are connected to a load and to the right-hand end of the wave guide 7, respectively. A proper choice of the length of the guides 25 and 26 ensures that precisely the side band emerges from the aerial 27, whereas the end 28 at which the carrier wave energy issues can be connected to the arm 7, so that the energy emanating therefrom is fed back.

What I claim is:

1. Apparatus for modulating ultra-high frequency waves produced by a generator in accordance with a modulating signal, said apparatus comprising a first wave guide coupled to said generator for conducting said ultra-high frequency waves therethrough, a second wave guide, said wave guides having a common wall and being coupled through a plurality of apertures in said common wall, first and second cavity resonators respectively coupled to said first and second wave guides at corresponding apertures in their respective walls, said resonators having identical reflection coefficients, a loading device non-reflectively coupled to said second wave guide, and means including substantially non-conductive ferrite rods inserted in said resonators for identically varying the reflection coefficients of said resonators by magnetizing said rods in accordance with said modulating signal, whereby said ultra-high frequency waves are modulated without changing the loading of said generator.

2. Apparatus as claimed in claim 1, in which said means for varying the reflection coefficients of said resonators includes means for subjecting each of said rods to a constant polarizing field acting in the longitudinal direction of each of said rods thereby to magnetically saturate said rods, and means to subject each of said rods to an alternating magnetic field substantially normal to said polarizing field in accordance with said modulating signal, whereby the resonance frequency of said resonator is varied accordingly by the process of gyromagnetism.

3. Apparatus as claimed in claim 2, in which said polarizing field means comprises a permanent magnet device having poles colinearly disposed relative to said rods, and in which said means to subject said rods to an alternating magnetic field includes windings positioned respectively adjacent each rod, the axes of said windings being perpendicular to said rods, respectively, and means for applying said modulating signal to said windings.

4. Apparatus as claimed in claim 1, in which said means for varying the reflection coefficients of said resonators includes means for pre-magnetizing said rods in their longitudinal directions by an amount less than the magnetic saturation value, and windings respectively surrounding said rods, said modulating signal being applied to said windings.

References Cited in the file of this patent

UNITED STATES PATENTS

| | | |
|---|---|---|
| 2,402,948 | Carlson | July 2, 1946 |
| 2,415,242 | Hershberger | Feb. 4, 1947 |
| 2,438,735 | Alexanderson | Mar. 30, 1948 |
| 2,445,896 | Tyrrell | July 27, 1948 |
| 2,453,453 | Norton | Nov. 9, 1948 |
| 2,473,448 | Rieke | June 14, 1949 |
| 2,496,772 | Bradley | Feb. 7, 1950 |
| 2,519,734 | Bethe | Aug. 22, 1950 |
| 2,560,859 | Gutton et al. | July 17, 1951 |
| 2,562,281 | Mumford | July 31, 1951 |
| 2,568,090 | Riblet | Sept. 18, 1951 |
| 2,573,746 | Watson | Nov. 6, 1951 |
| 2,586,993 | Riblet | Feb. 26, 1952 |
| 2,623,993 | Altar | Dec. 30, 1952 |
| 2,632,809 | Riblet | Mar. 24, 1953 |